(12) United States Patent
Zummo

(10) Patent No.: US 9,490,666 B1
(45) Date of Patent: Nov. 8, 2016

(54) MAGNETIC ENERGY CONVERTER

(71) Applicant: Thomas Alexander Zummo, Chicago, IL (US)

(72) Inventor: Thomas Alexander Zummo, Chicago, IL (US)

(*) Notice: Subject to any disclaimer, the term of this patent is extended or adjusted under 35 U.S.C. 154(b) by 0 days.

(21) Appl. No.: 15/001,675

(22) Filed: Jan. 20, 2016

(51) Int. Cl.
| | |
|---|---|
| *H02K 21/00* | (2006.01) |
| *H02K 1/06* | (2006.01) |
| *H02K 7/116* | (2006.01) |
| *H02K 53/00* | (2006.01) |

(52) U.S. Cl.
CPC ............. *H02K 1/06* (2013.01); *H02K 7/116* (2013.01); *H02K 53/00* (2013.01); *Y10S 74/09* (2013.01)

(58) Field of Classification Search
CPC ...... H02K 49/10; H02K 49/102; F03G 7/10; F03G 3/00; F03B 17/04
USPC .............. 310/20, 80, 103, 36–37, 40.5, 152; 74/DIG. 9
See application file for complete search history.

(56) References Cited

U.S. PATENT DOCUMENTS

| | | | | |
|---|---|---|---|---|
| 2002/0158531 A1* | 10/2002 | Aritaka | ................. | H02K 53/00 310/152 |
| 2007/0262665 A1* | 11/2007 | Park | ..................... | F16H 49/005 310/80 |
| 2008/0181804 A1* | 7/2008 | Tanigawa et al. | ...... | F04C 25/02 418/206.1 |
| 2013/0033141 A1* | 2/2013 | Yan | ....................... | H02K 53/00 310/152 |
| 2013/0147298 A1* | 6/2013 | Giummo | ................ | H02K 21/00 310/152 |
| 2015/0303779 A1* | 10/2015 | Jung | ...................... | H02K 53/00 310/152 |

* cited by examiner

*Primary Examiner* — Thanh Lam

(57) ABSTRACT

A magnetic energy converter is an apparatus using the repelling energy fields of magnets to provide continuous motion. The apparatus includes a first axis, a second axis, an at least one motion generating mechanism, an idler gear train, and a platform. Each motion generating mechanism is used to harness the repelling energy fields of magnets and includes a first disk, a first magnet, a second disk, and a second magnet. Each magnet is peripherally mounted onto their respective disk, which is axially mounted to their corresponding axis. The first magnet and the second magnet have synchronized orbits so that their repelling energy fields interact with each other to produce continuous motion. The platform is used as a base for the other components. The idler gear train transfers rotational motion from the first axis to the second axis at a 1:1 ratio and reverses the direction of the rotational motion.

12 Claims, 23 Drawing Sheets

US 9,490,666 B1

MAGNETIC ENERGY CONVERTER

FIELD OF THE INVENTION

The present invention relates generally to a means of creating mechanical motion from a self contained energy source indefinitely. This mechanical motion can either drive machinery or can drive electric generators to produce electrical current indefinitely. More specifically, the present invention will utilize the ability of directing continual energy for the mechanical motion of the four interconnected geared wheels of a synchronized and continuous orbiting pattern indefinitely.

BACKGROUND OF THE INVENTION

A means for alternative energy is beneficial to mankind, the planet's environment, and the economy. Any improvement to our living conditions provides overall realistic and needed contributions to the population of the planet and the available resources to provide a prosperous future.

Current means of producing alternative energy devices require an outside source to operate their mechanisms such as flowing water, or sunlight, or wind currents; but they cannot continually power themselves without an outside source of power. These energy sources are not truly energy independent. Some alternative power sources require certain thermal conditions for them to operate effectively.

Therefore, an objective of this present invention is to provide energy that requires no additional aid.

Conception for the present invention occurred prior to 2014 while work on completing the patent application for the present invention began during 2014.

DETAILED DESCRIPTION OF THE INVENTION

All illustrations of the drawings are for the purpose of describing selected versions of the present invention and are not intended to limit the scope of the present invention.

Figure 1:
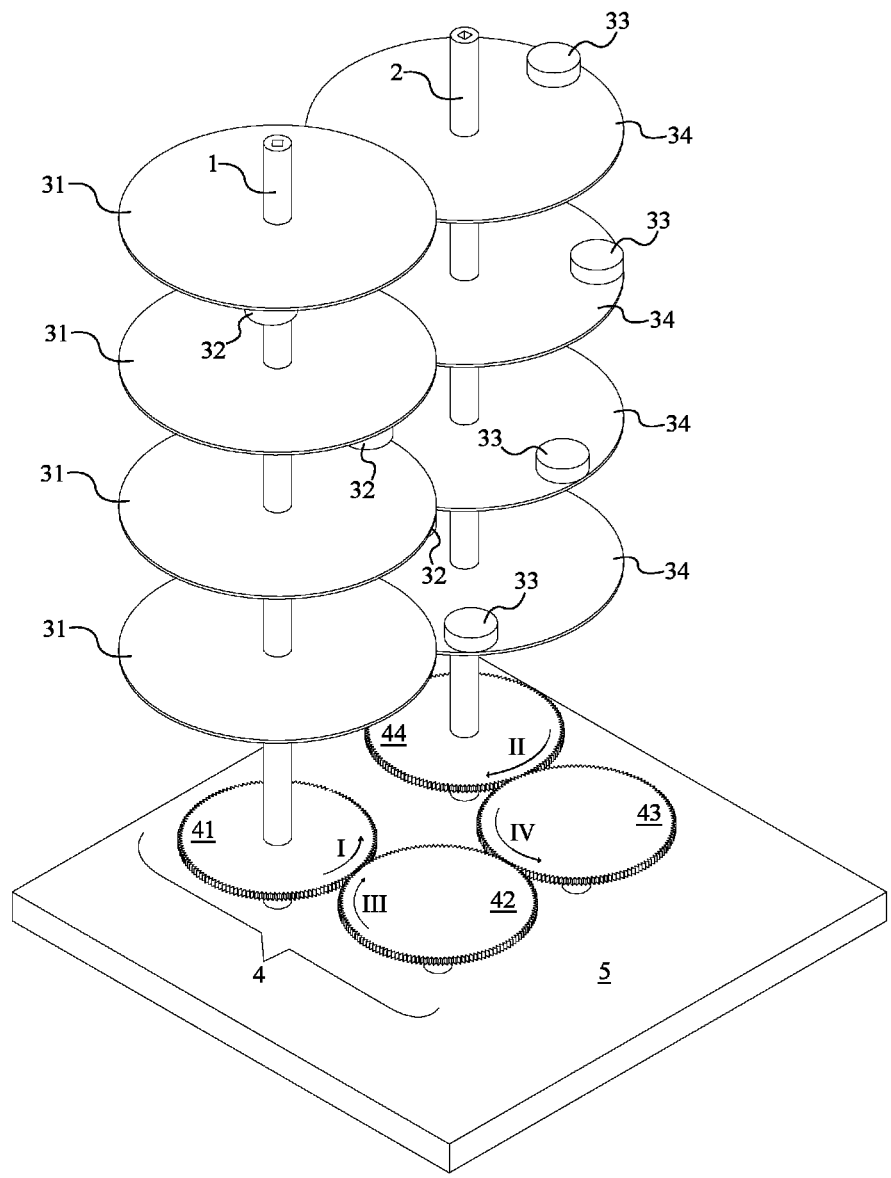
FIG. 1 is a top-left perspective view of the present invention.
Figure 2:
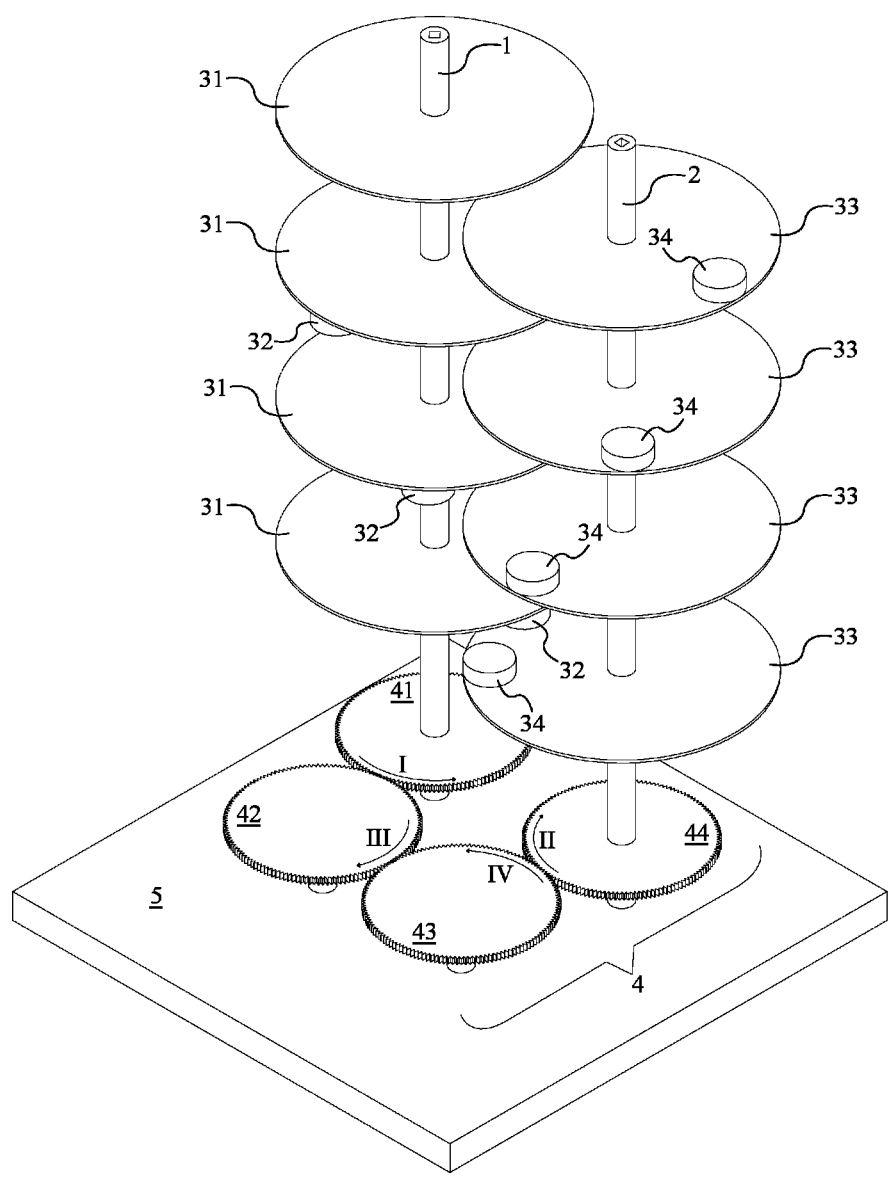
FIG. 2 is a top-right perspective view of the present invention.

As can be seen in FIGS. 1 and 2, the present invention is an apparatus for converting magnetic energy into motion. The present invention is a quiet and efficient means of generating power while being able to power itself. The present invention comprises a first axis 1, a second axis 2, an at least one motion generating mechanism 3, an idler gear train 4, and a platform 5. The motion generating mechanism 3 is used to convert magnetic energy into motion and is mechanically configured to function in conjunction with the first axis 1 and the second axis 2. The motion generating mechanism 3 is hereinafter referred to as a tier of the present invention. The first axis 1 and the second axis 2 are positioned parallel to each other and are rotatably mounted onto the platform 5. The platform 5 provides the present invention with a base to situate its other components. The idler gear train 4 allows the tier 3 to transfer motion from the first axis 1 to the second axis 2 and vice versa. Thus, the first axis 1 and the second axis 2 are in inverse rotational communication (or polarities) with each other through the idler gear train 4. For example, if the first axis 1 is rotating clockwise, then the second axis 2 is rotating counterclockwise, or, if the first axis 1 is rotating counterclockwise, then the second axis 2 is rotating clockwise.

Figure 6:
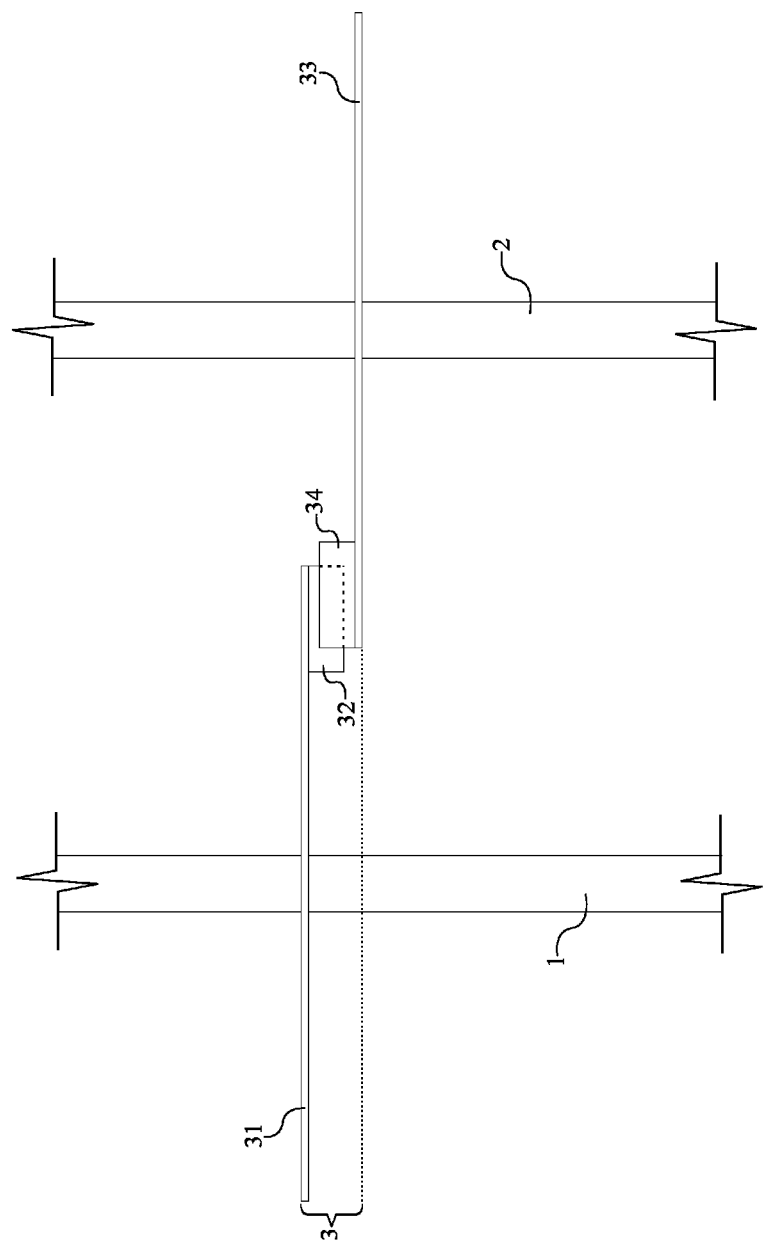
FIG. 6 is a front schematic view of a single motion generating mechanism for the present invention.
Figure 7:
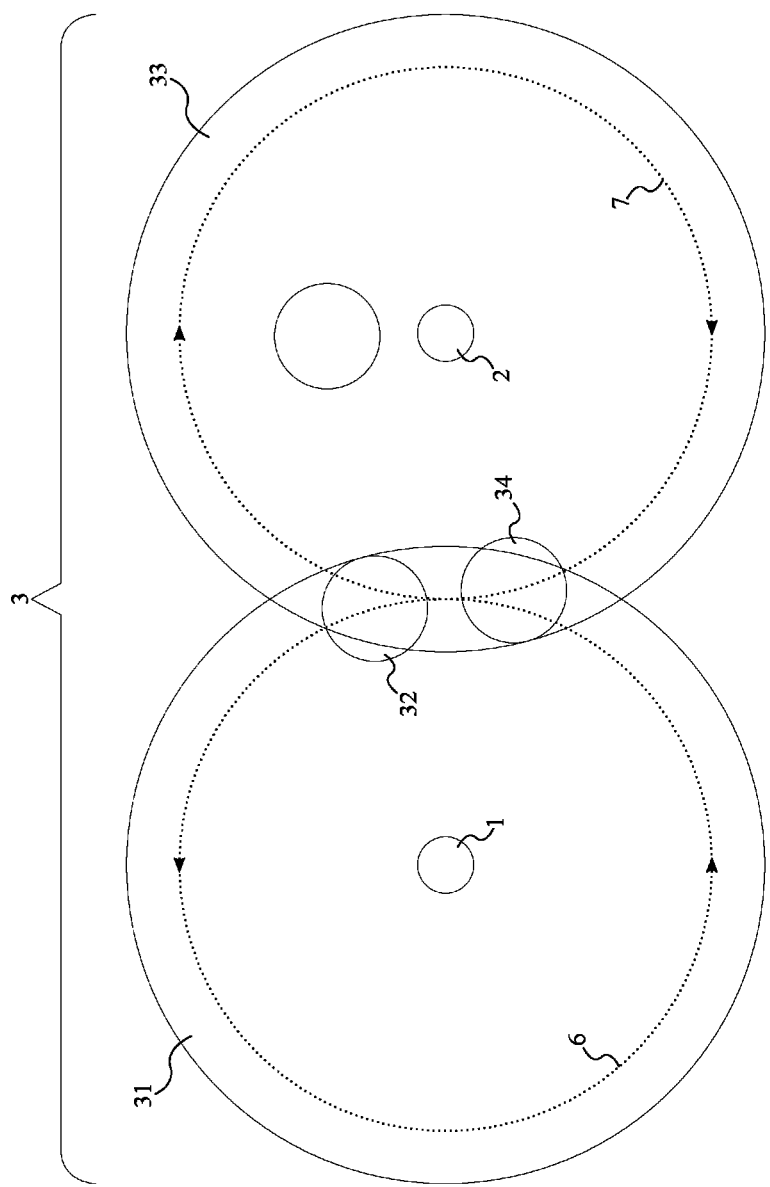
FIG. 7 is a top schematic view of a single motion generating mechanism for the present invention.

As can be seen in FIGS. 6 and 7, the configuration of the tier 3 in relation to the first axis 1, the second axis 2, and the idler gear train 4 allows the present invention to generate motion. Each of the at least one tier 3 comprises a first disk 31, an at least one first magnet 32, a second disk 33, and an at least one second magnet 34. The first disk 31 is used to guide an orbit 6 of the first magnet 32 around the first axis 1. Thus, the first disk 31 is axially connected to the first axis 1 so that the orbit 6 of the first magnet 32 is able to rotate the first axis 1. Similarly, the second disk 33 is used to guide an orbit 7 of the second magnet 34 around the second axis 2. Thus, the second disk 33 is axially connected to the second axis 2 so that the second axis 2 is able to rotate the second disk 33 and drive the orbit 7 of the second magnet 34.

Figure 4:
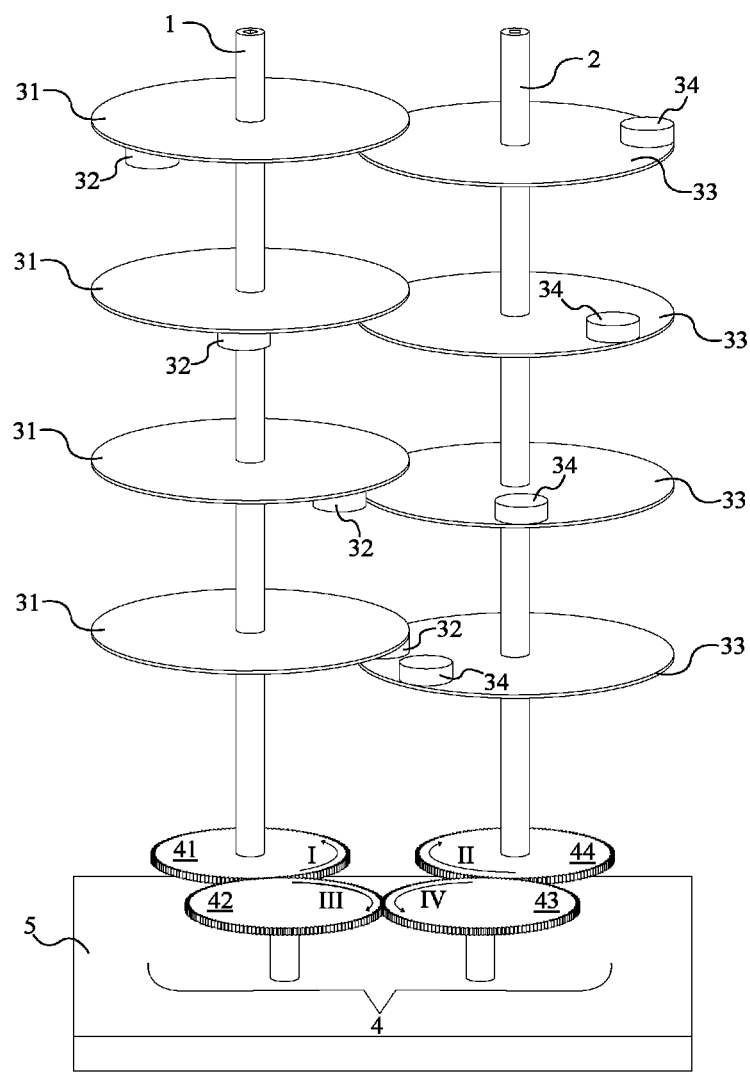
FIG. 4 is a front perspective view of the present invention, wherein the present invention is tilted downward.
Figure 5:
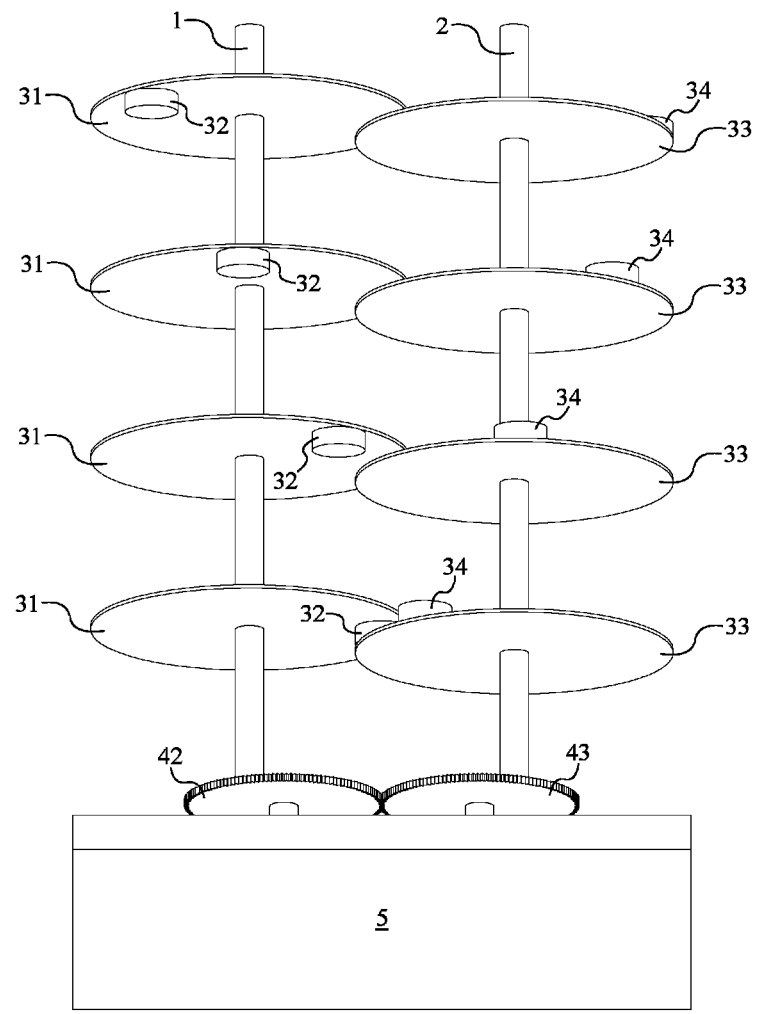
FIG. 5 is a front perspective view of the present invention, wherein the present invention is tilted upward.

The second disk 33 is offset from the first disk 31 along the first axis 1 so that the first magnet 32 and the second magnet 34 can be positioned in between the first disk 31 and the second disk 33, which is illustrated in FIGS. 4 and 5. Consequently, the first magnet 32 is able pass over the second disk 33 with minimal clearance, and the second magnet 34 is able to pass underneath the first disk 31 with minimal clearance, both of which allow the first magnet 32 and the second magnet 34 to follow their synchronized orbits without any mechanical interference. When the first magnet 32 and the second magnet 34 serially pass next to each other, the magnetic force of the first magnet 32 and the magnetic force of the second magnet 34 repel each other, which generates motion through reverse magnetism. In order for the first magnet 32 and the second magnet 34 to maintain their synchronized orbits, the first magnet 32 is peripherally connected to the first disk 31, and the second magnet 34 is peripherally connected to the second disk 33. This also positions the orbit 6 of the first magnet 32 about the first axis 1 to tangentially intersect the orbit 7 of the second magnet 34 about the second axis 2, which allows a negative arrangement of the first magnet 32 to be repelled by the flux power of the second magnet 34 with a positive arrangement. Thus, when the first magnet 32 and the second magnet 34 pass by each other in their synchronized orbits, the first disk 31 is forced to move to a point of least resistance because of the incoming force from the second disk 33. The timing for the orbit 6 of the first magnet 32 and the timing for the orbit 7 of the second magnet 34 need to be set so that the first magnet 32 and the second magnet 34 are able to pass next to each other, which is done by setting the first magnet 32 the second magnet 34 to be serially aligned with each other as the first magnet 32 and the second magnet 34 approach the tangential intersection between said orbit 6 of said first magnet 32 and said orbit 7 of said second magnet 34. This prevents the first magnet 32 and the second magnet 34 from ever becoming stacked onto one another and from ever coming into contact with each other.

The configuration of the first magnet 32 on the first disk 31 and the configuration of the second magnet 34 of the second disk 33 allow for a synchronized and continuous pattern of interactions between the first magnet 32 and the second magnet 34. More specifically, these configurations allow the orbit 6 of the first magnet 32 to be perpendicular to the first axis 1 and allow the orbit 7 of the second magnet 34 to be perpendicular to the second axis 2 so that the orbit 6 of the first magnet 32 and the orbit 7 of the second magnet 34 remain offset from each other by a magnet thickness clearance, which allows the first magnet 32 to pass over the second disk 33 with minimal separation and allows the second magnet 34 to pass over the first disk 31 with minimal separation as well. Thus, each instance of the synchronized and continuous pattern occurs as the first magnet 32 and the second magnet 34 proximally pass by each other but without ever making physical contact with each other, which allows the flux power on the surface of the first magnet 32 and the second magnet 34 to repel the energy fields emitted around the first magnet 32 and the second magnet 34 (via: inducing an electromagnetic field). The interaction between the flux power of the first magnet 32 and the energy field of the second magnet 34 and the interaction between the flux power of the second magnet 34 and the energy field of the first magnet 32 cause the rotation of the first disk 31 and the second disk 33 and consequently cause the threshold of motion to continuously occur.

Figure 10:
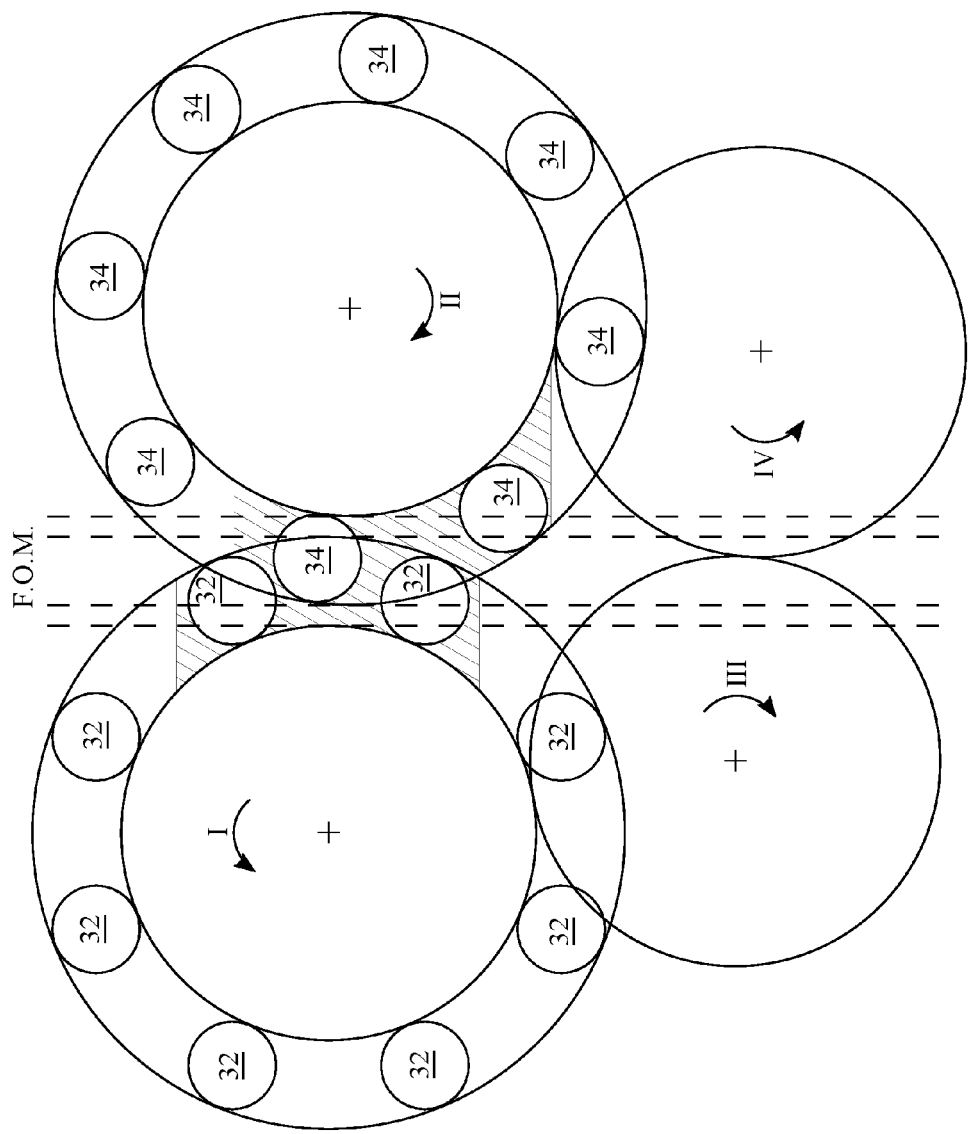
FIG. 10 is a top schematic view of a single motion generating mechanism producing continuous motion as its magnets enter and exit the field of motion (FOM).
Figure 11:
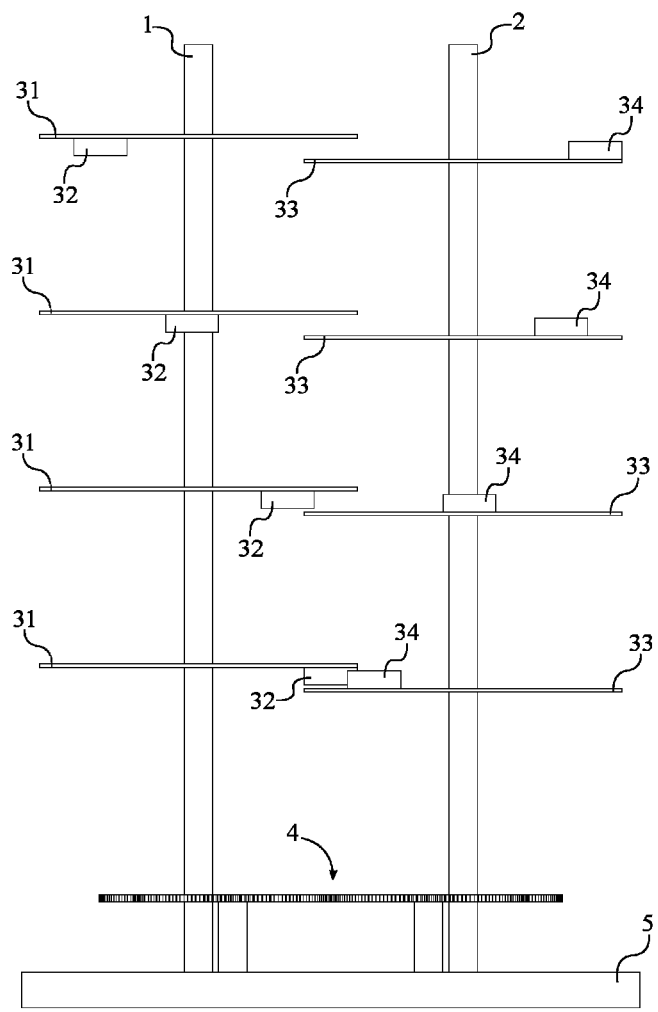
FIG. 11 is a front view of the present invention, wherein the magnets on the first tier of the present invention are interacting with each other.
Figure 12:
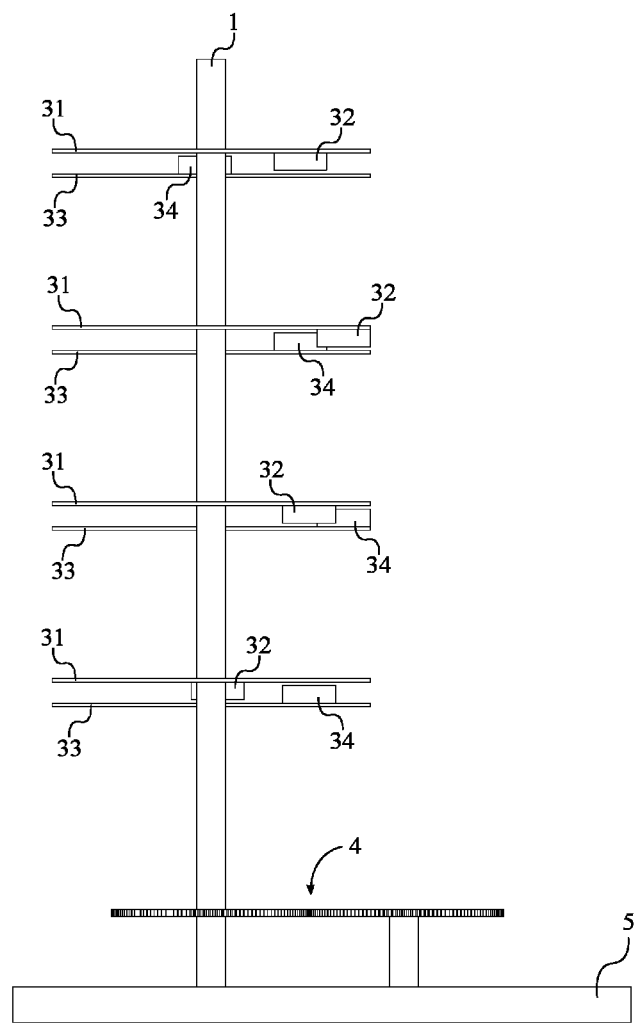
FIG. 12 is a left side view of the present invention, wherein the magnets on the first tier of the present invention are interacting with each other.
Figure 13:
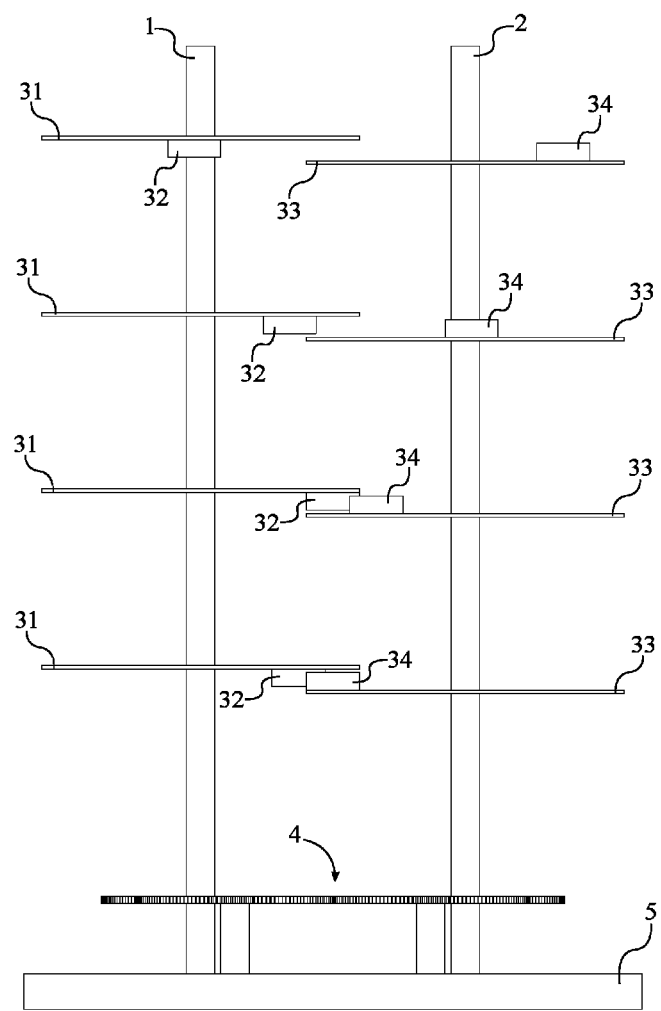
FIG. 13 is a front view of the present invention, wherein the magnets on the second tier of the present invention are interacting with each other.
Figure 14:
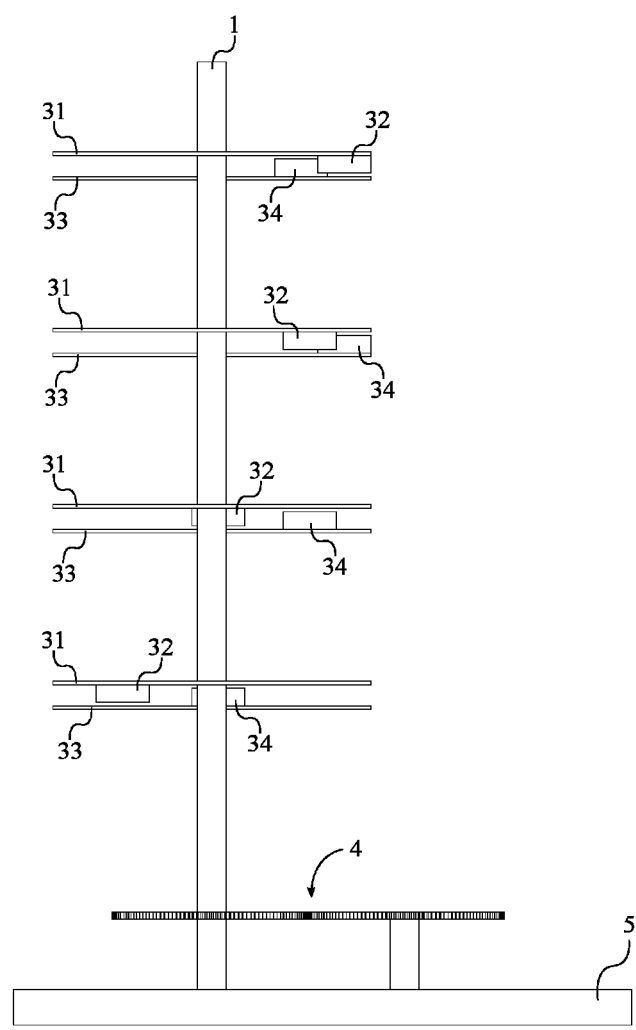
FIG. 14 is a left side view of the present invention, wherein the magnets on the second tier of the present invention are interacting with each other.
Figure 15:
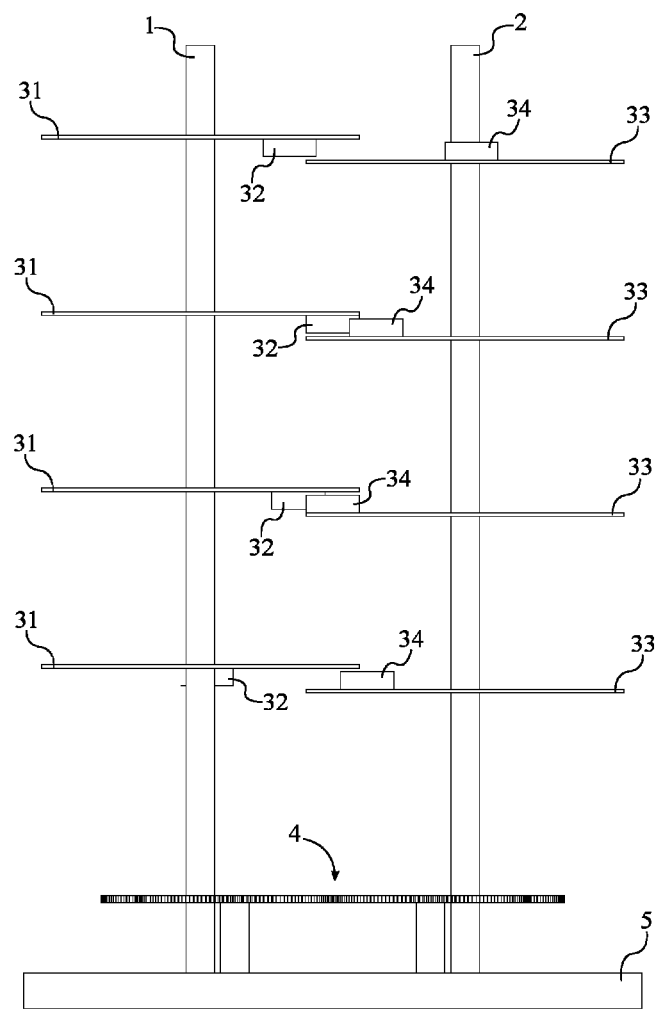
FIG. 15 is a front view of the present invention, wherein the magnets on the third tier of the present invention are interacting with each other.
Figure 16:
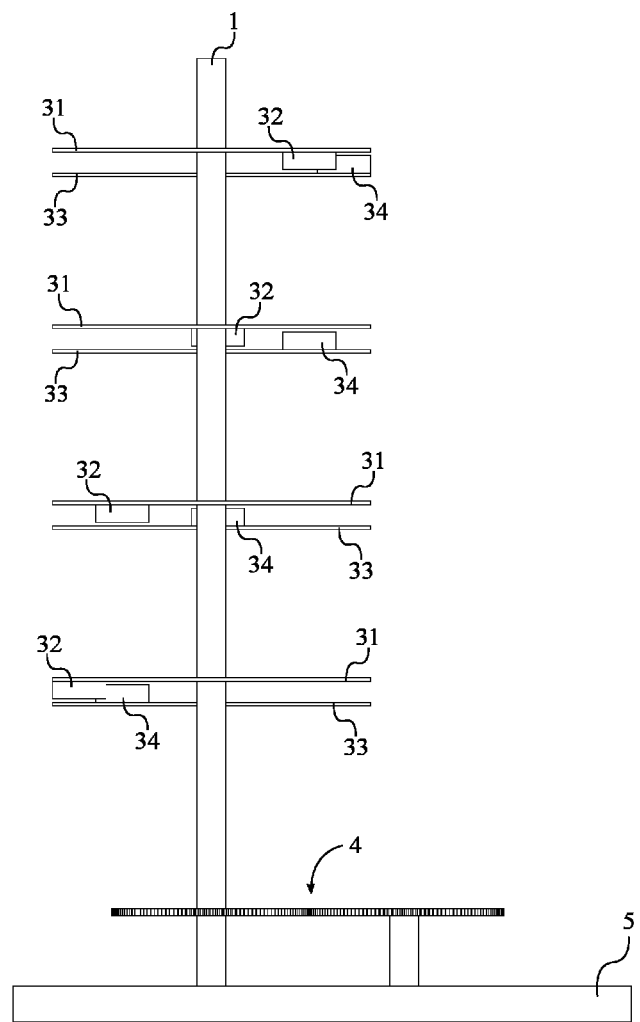
FIG. 16 is a left side view of the present invention, wherein the magnets on the third tier of the present invention are interacting with each other.
Figure 17:
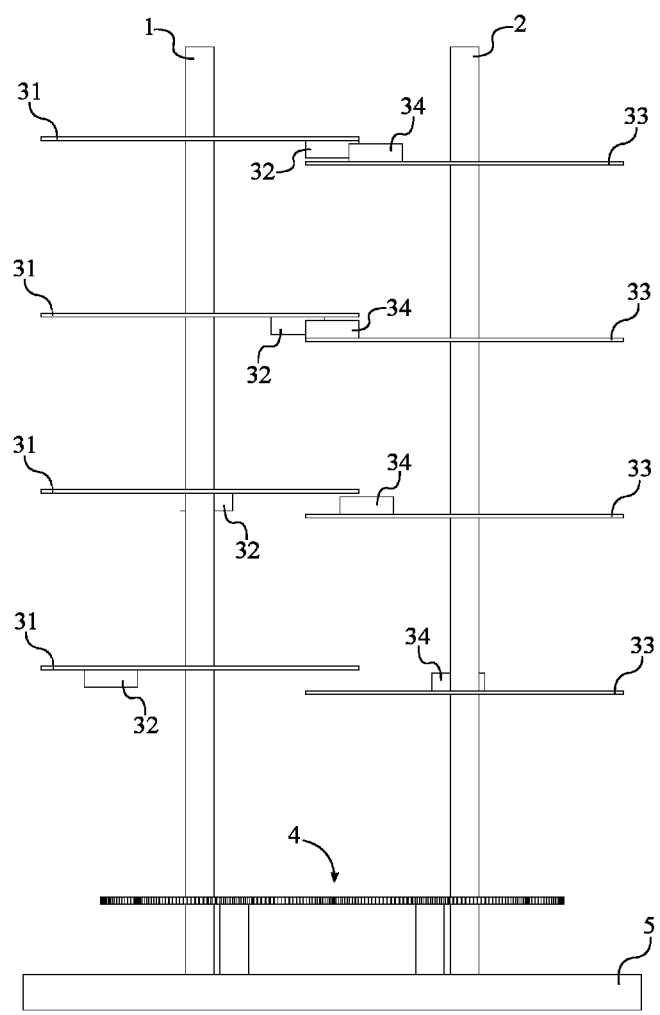
FIG. 17 is a front view of the present invention, wherein the magnets on the fourth tier of the present invention are interacting with each other.
Figure 18:
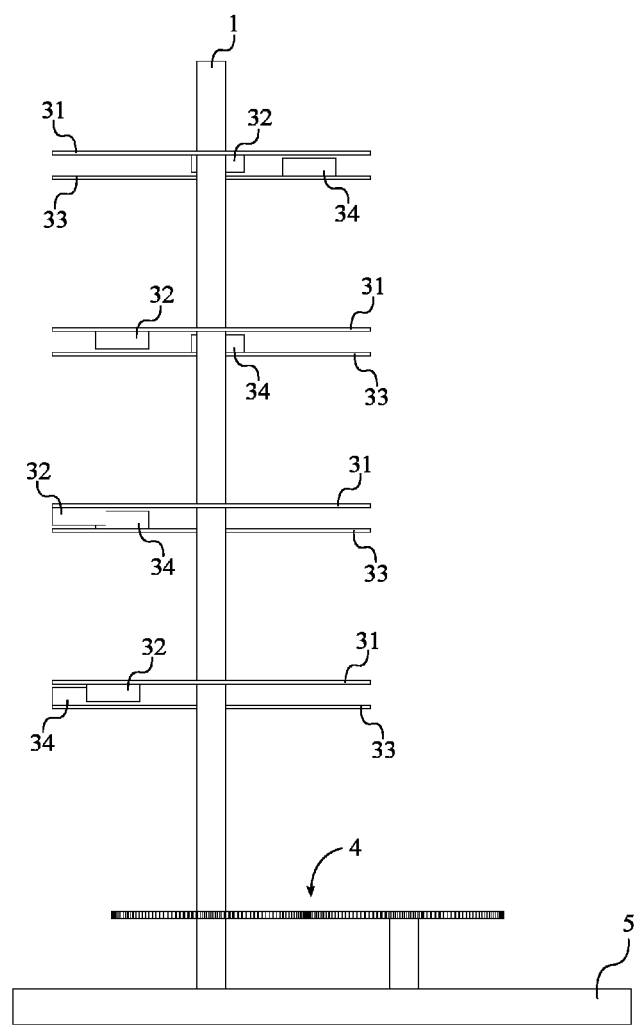
FIG. 18 is a left side view of the present invention, wherein the magnets on the fourth tier of the present invention are interacting with each other.

As can be seen in FIG. 10, the fluxion is the movement (or motion) that is initiated by the repelling magnetic fields of the first magnet 32 and the second magnet 34 as the first magnet 32 and the second magnet 34 converge on each other in their synchronized orbits. The repelling magnetic fields of the first magnet 32 and the second magnet 34 begin to interact with each other at the beginning of the fluxion and stop interacting with each other at the end of the fluxion. The region where the fluxion occurs is known as the field of motion (FOM) and is located around the intersection of the orbit 6 of the first magnet 32 and the orbit 7 of the second magnet 34.

Moreover, in order to keep the first disk 31 and the second disk 33 respectively rotating about the first axis 1 and the second axis 2, the present invention can be altered by two different features to generate continuous fluxion. One feature is to have multiple first magnets 32 radially mounted onto the first disk 31 and to have multiple second magnets 34 radially mounted onto the second disk 33. Thus, each of the multiple first magnets 32 would have a corresponding magnet from the multiple second magnets 34. For example, if three magnets are radially mounted around the first disk 31, then three corresponding magnets would be radially mounted on the second disk 33. In addition, an arbitrary first magnet from the multiple first magnets 32 and a corresponding second magnet from the multiple second magnets 34 would be serially aligned with each other as the arbitrary magnet and the corresponding second magnet approach the tangential intersection between the orbit of the multiple first magnets 32 and the orbit of the multiple second magnets 34. Consequently, this feature allows magnets with repelling energy fields to repetitiously enter the FOM without interruption (or pause or loss of a continuous position of force) through the opposite rotations from the first disk 31 and the second disk 33 and, therefore, allows the present invention to generate continuous fluxion.

Figure 8:
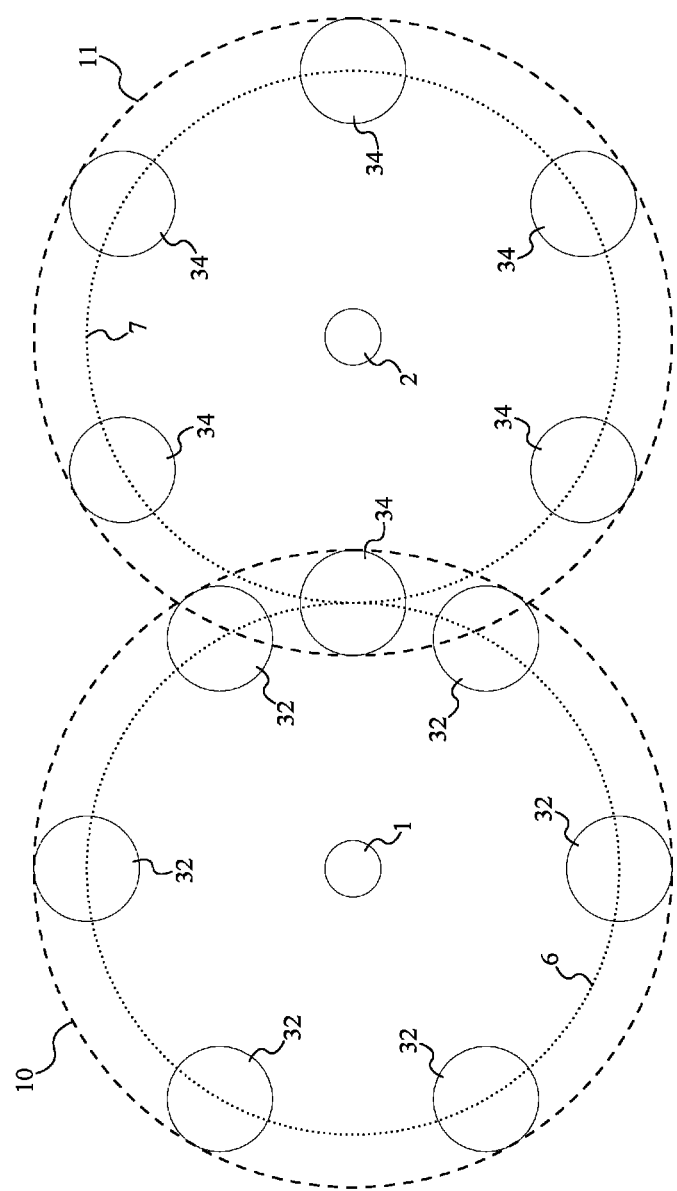
FIG. 8 is a top schematic view of multiple motion generating mechanism for the present invention, wherein the circular profile of the first disks and the circular profile of the second disks are shown.

Another feature that allows the present invention to keep generating continuous fluxion is to have multiple tiers 3. The first axis 1 and the second axis 2 have a specified length, and the specified length is proportionately determined by the required number of tiers 3 so that more tiers 3 require a longer specified length and less tiers 3 require a shorter specified length. This is because multiple tiers 3 are evenly distributed along the specified length. Moreover, a set of first magnets needs to be radially distributed about a first circular profile 10, which illustrated in FIG. 8. The first set of magnets includes the first magnet 32 from each of the multiple tiers 3, and the first circular profile 10 is perimetrically delineated by the first disk 31 for each of the multiple tiers 3. Similarly, a set of second magnets needs to be radially distributed about a second circular profile 11. The second set of magnets includes the second magnet 34 from each of the multiple tiers 3, and the second circular profile 11 is perimetrically delineated by the second disk 33 for each of the multiple tiers 3. Consequently, this feature also allows magnets with repelling energy fields to repetitiously enter the FOM without interruption through the opposite rotations of the first axis 1 and the second axis 2 and, therefore, also allows the present invention to generate continuous fluxion.

FIGS. 11 to 18 illustrate how magnets are able to continuously enter and exit the FOM.

In order for the first feature and the second feature of the present invention to perform as anticipated, the energy field emitted by each magnet on the present invention should be equal and should not change regardless of the size, the scale, or the power of the present invention. Thus, the power, the energy, the kinetic inertia originally emitted around each magnet is precisely controlled as each magnet enters and exits the FOM. The first feature and the second feature assist the first disk 31 and the second disk 33 to complete their 360 degree revolution by overcoming the reduction in rotational speed due to entropy. In addition, the first axis 1 and the second axis 2 are positioned normal to the platform 5 and are offset from each other across the platform 5, which orients the first axis 1 and the second axis 2 in the most efficient manner in order to keep proper timing of each magnet entering and exiting the FOM.

Figure 3:
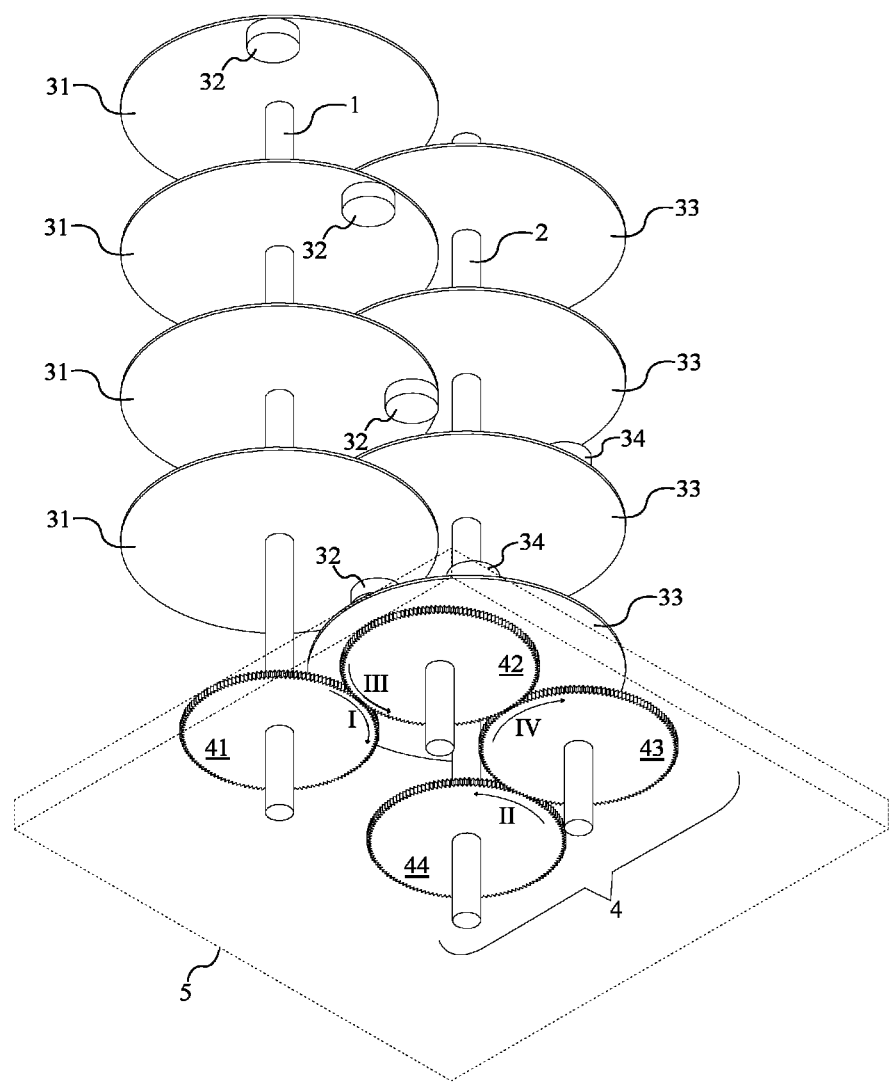
FIG. 3 is a bottom-left perspective view of the present invention, wherein the platform is shown as transparent with dotted lines.

As can be seen in FIG. 3, the idler gear train 4 allows the first axis 1 and the second axis 2 to maintain the same rotational speed with stability and accuracy of motion. The idler gear train 4 comprises a drive gear 41 with a rotational direction of I, a first intermediate gear 42 with a rotational direction of II, a second intermediate gear 43 with a rotational direction of III, and a follower gear 44 with a rotational direction of IV, each of which is an identically-shaped, geared wheel with a fixed central axis to continuously insure balance and precise motion. The drive gear 41 is the geared wheel that receives rotational motion from the first axis 1 in order to actuate the idler gear train 4, and, thus, the drive gear 41 is axially connected to the first axis 1. The first intermediate gear 42 and the second intermediate gear 43 are a means of transferring rotational motion from the first axis 1 to the second axis 2 and need to be independently and rotatably mounted onto the platform 5. The follower gear 44 is the geared wheel that outputs rotational motion into the second axis 2, and, thus, the follower gear 44 is axially connected to the second axis 2. In order to transfer the rotational motion from the first axis 1 to the second axis 2 at the same rotational speed, each of the identically-shaped, geared wheels are serially engaged to each other. First, the drive gear 41 is engaged to the first intermediate gear 42 at a gear ratio of 1:1, which changes the rotational motion received by the drive gear 41 from its original direction to an opposite direction. Then, the first intermediate gear 42 is engaged to the second intermediate gear 43 at a gear ratio of 1:1, which changes the rotational motion from the opposite direction back to its original direction. Finally, the second intermediate gear 43 is engaged to the follower gear 44 at a gear ratio of 1:1, which changes the rotational motion from its original direction back to the opposite direction so that the second axis 2 rotates in the opposite direction of the first axis 1. Thus, the idler gear train 4 is configured with a V-shaped formation with the drive gear 41 and the follower gear 44 never touching each other, allowing the magnets on each disk to repeat their synchronized orbits just like a planet rotates about its star.

The first axis 1, the second axis 2, and the axes for the first intermediate gear 42 and the second intermediate gear 43 are hollow rigid tubes that are made of a synthetic material, which result in a lighter weight and less drag. Having these hollow rigid tubes as the first axis 1 and the second axis 2 allows a user to easily set the height of the first disk 31 and the second disk 33 respectively along the first axis 1 and the second axis 2. A set screw can be used to fix the first disk 31 to the first axis 1 and can be used to fix the second disk 33 to the second axis 2. The height and angular positioning of each disk can be adjusted by the set screw, which allows the user to adjust each disk to have continuous coordination of 360 degree revolutions continuously in motion. In addition, there is nearly no resistance what so ever to slow down the first magnet 32 and the second magnet 34 in their synchronized orbits because ample torque, inertia, and kinetic magnetic flux facilitate the increased efficiency and the anticipated performance.

There are four scientific principles that are able to describe what is occurring within the FOM that allows the present invention to convert magnetic energy into motion. The first scientific principle is first law of thermodynamics, which describes the exchange of energy between the components of the present invention. The energy is stored (induced) until needed. The second scientific principle relates to dyne physics, which describes how momentum is transferred between the components of the present invention. The third scientific principle relates to theoretical mechanical advantage, which describes the ratios that the components of the present invention are mechanically interacting with each other. The fourth scientific principle relates to Newton's three laws of motion, which describes how the components of the present invention interact with each other in motion ($F=MA^2$).

Figure 22:
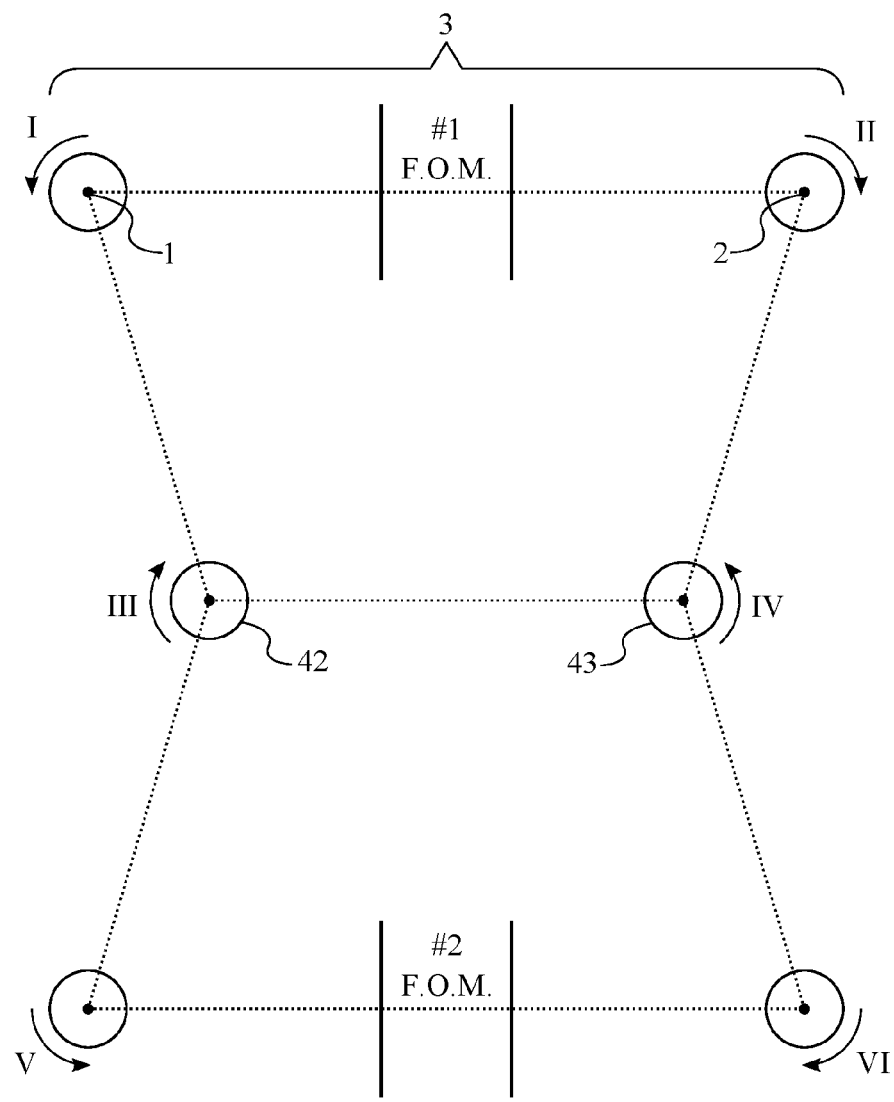
FIG. 22 is a top schematic view of multiple of the present invention being mechanically connected to each other and being synchronized with each other.

In some embodiments of the present invention, the torque from another FOM can be applied to the first intermediate gear 42 and the second intermediate gear 43. As can be seen in FIG. 22, FOM #1 is generated by the aforementioned components of the present invention, which includes the first axle 1, the second axle 2, and the motion generating mechanism 3. In order to generate a FOM #2, the first axle 1, the second axle 2, and the motion generating mechanism 3 are mechanically mirrored on the other side of the first intermediate gear 42 and the second intermediate gear 43. The drive gear that is axially connected to the mirrored first axle 14 has a rotational direction V illustrated in FIG. 22 and is engaged to the first intermediate gear 42. Likewise, the follower gear that is axially connected to the mirrored second axle 15 has a rotational direction VI illustrated in FIG. 22 and is engaged to the second intermediate gear 43. This configuration allows for the mirrored first axle 14 and the mirrored second axle 15 to transfer the torque generated by FOM #2 to the first intermediate gear 42 and the second intermediate gear 43, which would increase the present invention's power output as a whole. This configuration also explains how multiple of the present invention could be interconnected with each other in order to create a power generating grid for any practical use.

The present invention can be made to any size or scale to efficiently meet the energy demands of the required work. For example, the present invention can be scaled from the tiny gears of a watch to the size of a city square block. As long as the overall design is carefully followed, the present invention is able to operate at any size. Size of the present invention also matters in terms of the expected performance as well as the scale and quantity of magnets used per disk. Moreover, one tradeoff for using less tiers 3 is to compact the size of the present invention. By using a disk with a larger diameter, more magnets can be peripherally mounted about each disk, and, thus, the present invention is able to provide the same performance as if the present invention had a larger number of tiers 3. There are various optimization options that can be applied to the present invention, but the overall design and the basic principles of the present invention remain the same.

Some design features of the idler gear train 4 need to be considered to improve the overall efficiency of the present invention. One such design feature to consider is what kind of gear edges for the idler gear train 4 should be used in order to best transfer mechanical inertia, convert energy into work, convert energy into current, or improve performance. Two kinds of gear edges could be, but are not limited to, a spur design or a beveled design. Another such design feature to consider is that the idler gear train 4 is interconnected like the gears of a watch or clock synchronized to a specific motion, but that specific motion is not driven by a spring like in a watch or a clock. The specific motion of the idler gear train 4 is driven by the unlimited amount of power being emitted around each magnet.

Figure 9:
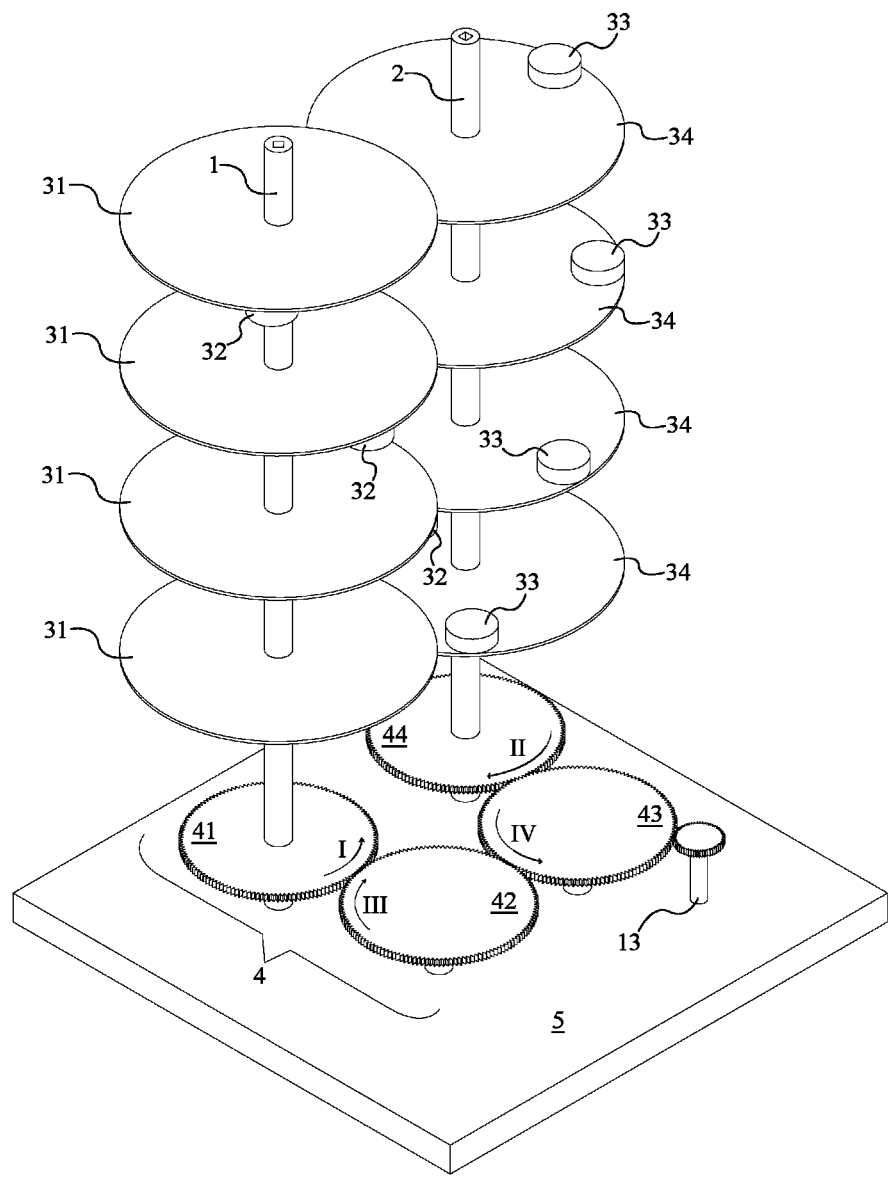
FIG. 9 is a left perspective view of the present invention showing how the additional geared wheel engages to the idler gear train.

As can be seen in FIG. 9, because of the superb balance and strength optimized by the idler gear train 4, a smaller geared wheel 13 can be engaged to one of the geared wheels in the idler gear train 4 in order to provide a rotational output at faster revolutions per minute (RPMs). Alternatively, a larger geared wheel can be engaged to one of the geared wheels in the idler gear train 4 in order to provide a rotational output at slower RPMs. Moreover, any number of additional geared wheels can be engaged to one of geared wheels of the idler gear train 4 in order to accommodate a variety of external mechanical usages. One such external mechanical usage is to rotate the armature of an electric generator, which creates electric current that can be added to a series circuit of currents in order to produce a greater electrical charge/current. The overall design of the present invention allows for different external usages to be implemented without any restrictions on special atmospheric conditions. For example, the present invention can operate in the arctic cold, underwater, or in space due its own gravity field by virtue of its magnetic field. The electric current produced by the present invention can be used on a variety of electronic devices that may require a low current or a greater current. The present invention may be used with low-current electronic devices such as, but not limited to, a smoke alarm and a cell-phone/computer charger. The present invention may also be used with high-current electronic devices such as, but not limited to, home appliances, electrical automobile engines, any electrical motor requiring electric current, emergency equipment, and medical equipment.

Figure 23:
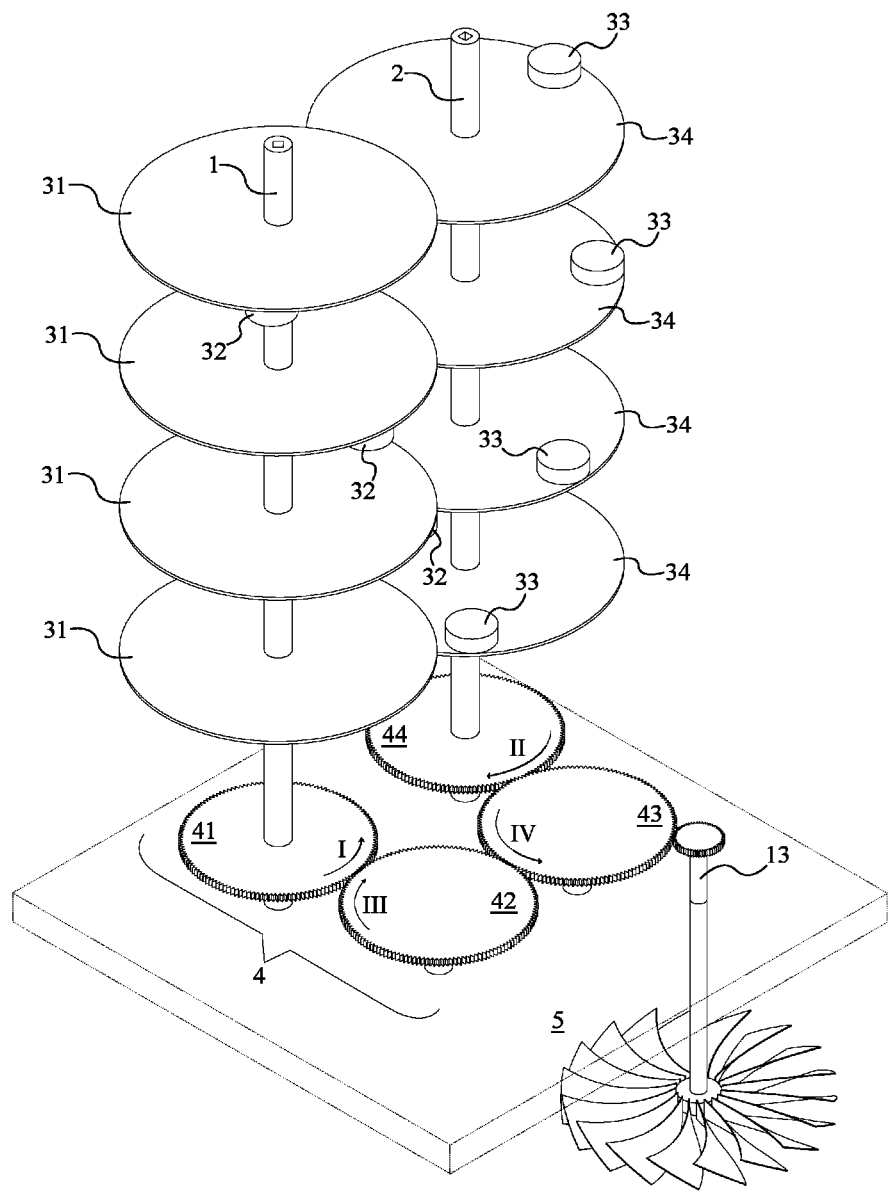
FIG. 23 is a left perspective view of the present invention being used by a propeller connected to the additional geared wheel.

The present invention implements the principle of self-contained motion, and, therefore, an additional geared wheel engaged to one of the geared wheels of the idler gear train 4 allows the present invention to power any mechanism requiring operational force/power. For example, the additional geared wheel can be rotated at faster RPMs in order to rotate the armature of an electric generator and to create electrical current, as previously mentioned. However, the additional geared wheel can be used to power different practical devices such as, but not limited to, spinning a fan, driving a paddle wheel to move a boat, or filling/draining water. Some more complex practical devices that can be powered by the present invention include, but are not limited to, propeller blades to move a boat across water (FIG. 23), medical pumps for oxygen, other associated medical usages, and implementing a cam for mechanical motion/repetition.

The aforementioned usages require the present invention to produce drastically different amounts of power. Consequently, the present invention is configured through variety of options in order to produce the necessary initial torque/force required to operate a specific usage. Such a configuration of the present invention is known as the "configuration of choice". One option for the configuration of choice would be to include more tiers 3 because the scale of the present invention is proportional to the strength of torque. Another option for the configuration of choice would be to increase the size of each magnet, but the flux power of each magnet must be uniform. Another option for the configuration of choice would be to increase the size of each disk so that the number of magnets per disk can be increased. This is because the magnets are mounted to the circumference of a disk, and, thus, a larger circumference for each disk would allow for a greater number of magnets per disk. Another option for the configuration of choice would be to engage more than one high RPM geared wheel to the geared wheels of the idler gear train 4, which could produce a plurality of additional performance.

Figure 19:
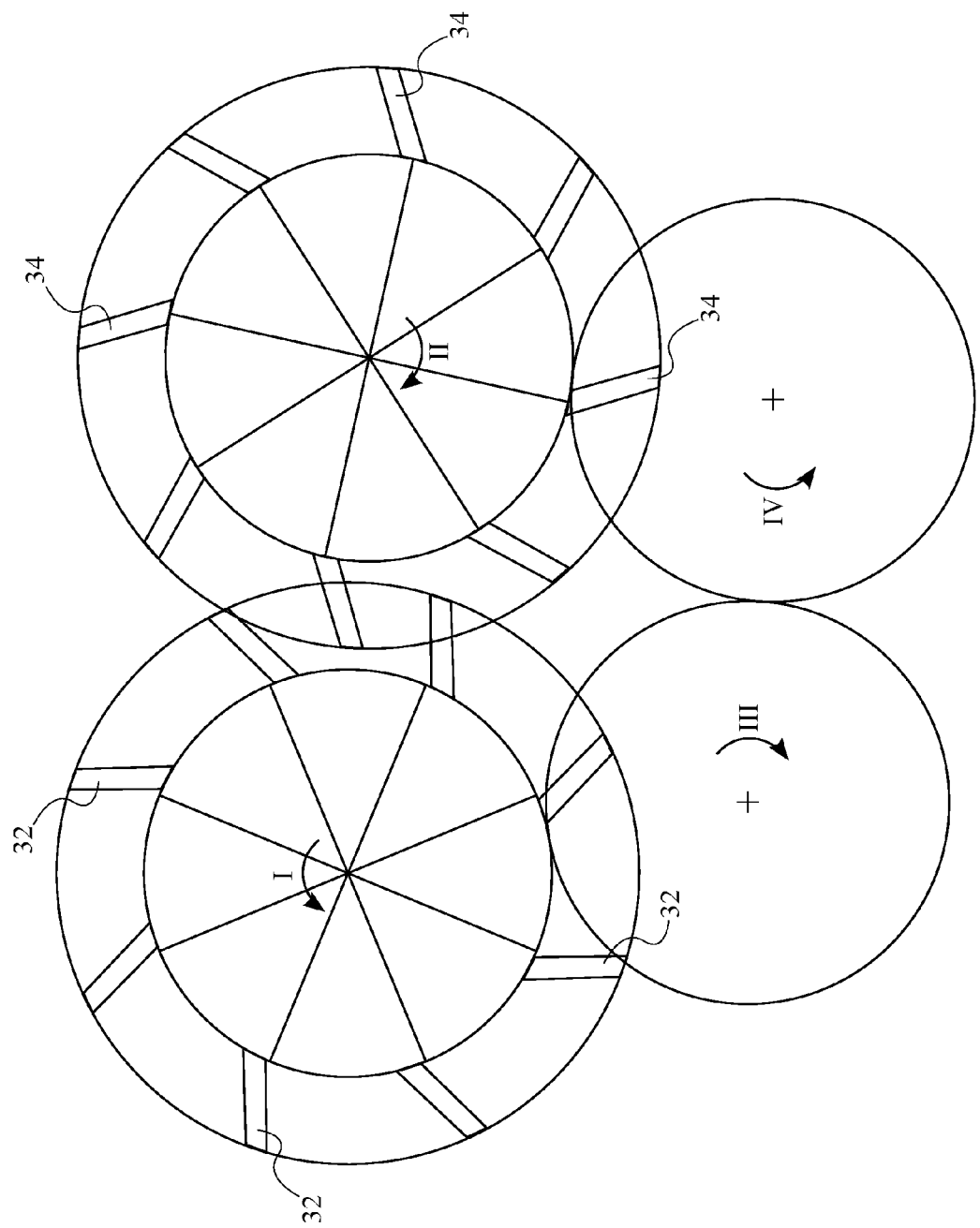
FIG. 19 is a top schematic view of a single motion generating mechanism using slanted magnets on both the first disk and the second disk.
Figure 20:
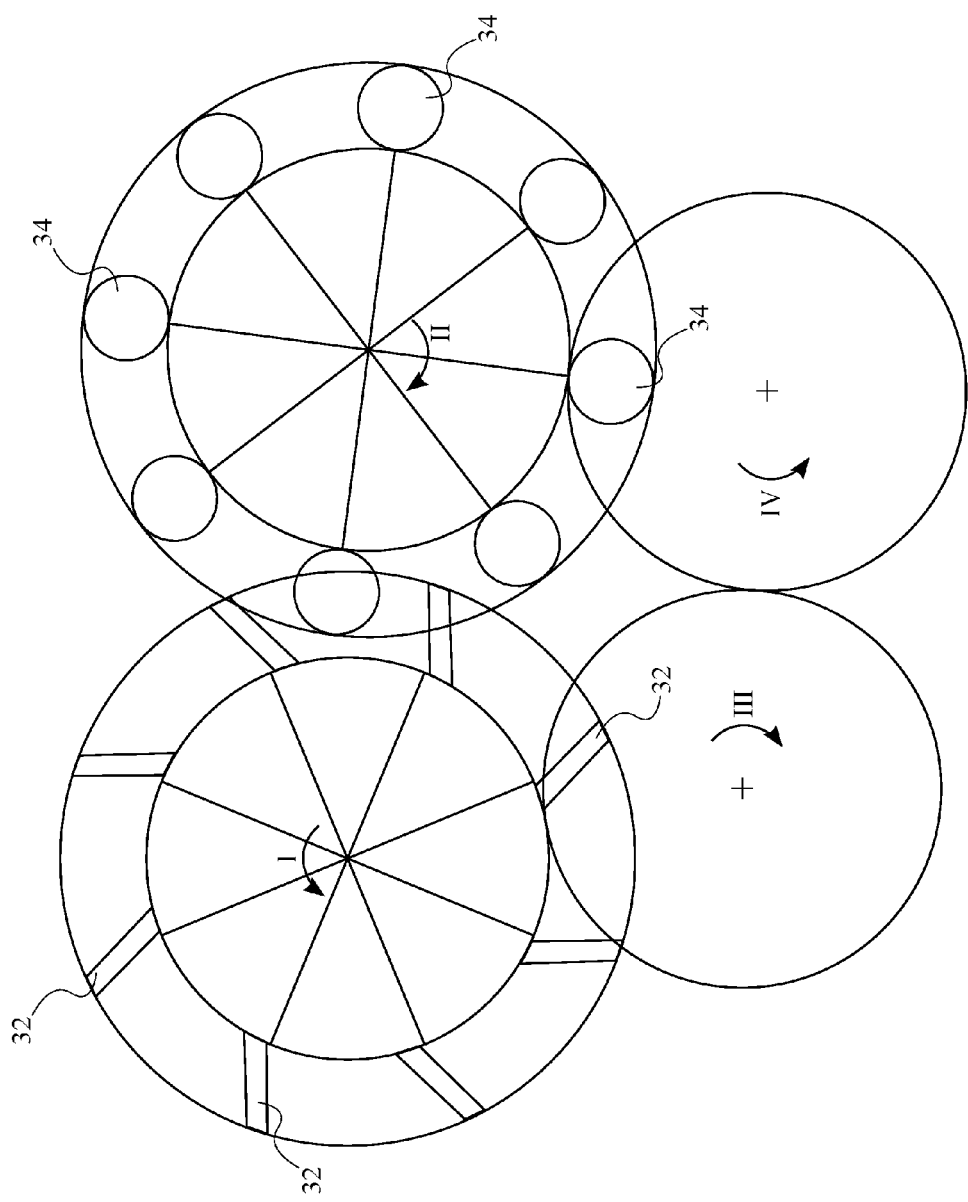
FIG. 20 is a top schematic view of a single motion generating mechanism using slanted magnets on the first disk and circular magnets on the second disk.
Figure 21:
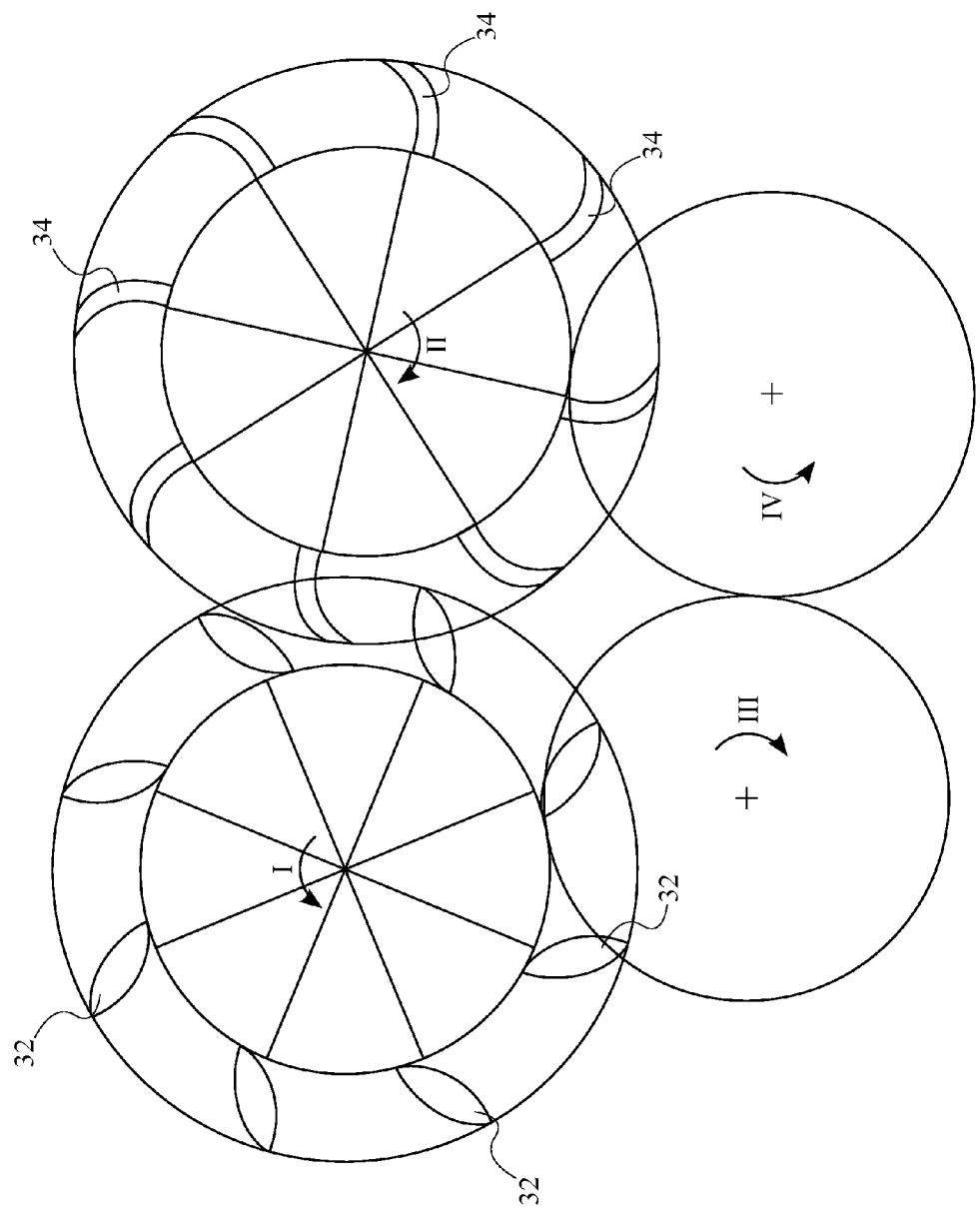
FIG. 21 is a top schematic view of a single motion generating mechanism using eye-shaped magnets on the first disk and crescent-shaped magnets on the second disk.

In summary, the present invention implements the principle of self-contained motion by following a set of tenets. One such tenet is that the geared wheels of the idler gear train 4 have superb balance in order to reduce drag, friction, and resistance, which optimizes the interactions between the magnets. Another tenet is that at least two sets of magnets should be entering and exiting the FOM at any one given time, which allows the present invention to generate sufficient inertia for continual motion to occur. Another tenet is that the number and shape of the magnets used for all disks is only relevant to the flux power/strength of each magnet. In variations of the present invention, the magnets mounted onto each disk can differ in shape, which is shown in FIGS. 19 to 21. The preferred shape is a round flat magnet, but a magnet's shape can be, but not limited to, oval, flat, square, and curved. In all anticipated aspects of performance by the present invention, the key rule is that the present invention must maintain balance of all interactions, both visible and invisible to the eye.

Although the invention has been explained in relation to its preferred embodiment, it is to be understood that many other possible modifications and variations can be made without departing from the spirit and scope of the invention as hereinafter claimed.

What is claimed is:

1. A magnetic energy converter comprises:
a first axis;
a second axis;
an at least one tier (hereinafter referred to as tier);
an idler gear train;
a platform;
each of said at least one tier comprises a first disk, an at least one first magnet, a second disk, and an at least one second magnet;
said first axis and said second axis being positioned parallel to each other;
said first axis and said second axis being rotatably mounted onto said platform;
said first axis and said second axis being in inverse rotational communication with each other through said idler gear train;
said first disk being axially connected to said first axis;
said second disk being offset from said first disk along said first axis;
said second disk being axially connected to said second axis;
said first magnet and said second magnet being positioned in between said first disk and said second disk;
said first magnet being peripherally connected to said first disk;
said second magnet being peripherally connected to second disk;
an orbit of said first magnet about said first axis tangentially intersecting an orbit of said second magnet about said second axis; and said first magnet and said second magnet being serially aligned with each other as said first magnet and said second magnet approach said tangential intersection between said orbit of said first magnet and said orbit of said second magnet.

2. The magnetic energy converter as claimed in claim 1 comprises:
   said orbit of said first magnet being perpendicular to said first axis;
   said orbit of said second magnet being perpendicular to said second axis; and
   said orbit of said first magnet and said orbit of said second magnet being offset from each other by a magnet thickness clearance.

3. The magnetic energy converter as claimed in claim 1 comprises:
   said first axis and said second axis being positioned normal to said platform; and
   said first axis and said second axis being offset from each other across said platform.

4. The magnetic energy converter as claimed in claim 1 comprises:
   said idler gear train comprises a drive gear, a first intermediate gear, a second intermediate gear, and a follower gear;
   said drive gear being axially connected to said first axis;
   said first intermediate gear and said second intermediate gear being rotatably mounted onto said platform;
   said follower gear being axially connected to said second axis;
   said drive gear being engaged to said first intermediate gear;
   said first intermediate gear being engaged to said second intermediate gear; and
   said second intermediate gear being engaged to said follower gear.

5. The magnetic energy converter as claimed in claim 4, wherein said drive gear and said first intermediate gear is at a gear ratio of 1:1.

6. The magnetic energy converter as claimed in claim 4, wherein said first intermediate gear and said second intermediate gear is at a gear ratio of 1:1.

7. The magnetic energy converter as claimed in claim 4, wherein said second intermediate gear and said follower gear is at a gear ratio of 1:1.

8. The magnetic energy converter as claimed in claim 1 comprises:
   said at least one first magnet being multiple first magnets;
   said at least one second magnet being multiple second magnets;
   said multiple first magnets being radially mounted onto said first disk;
   said multiple second magnets being radially mounted onto said second disk; and
   an arbitrary first magnet from the multiple first magnets and a corresponding second magnet from the multiple second magnets being serially aligned with each other as said arbitrary first magnet and said corresponding second magnet approach said tangential intersection between said orbit of said multiple first magnets and said orbit of said multiple second magnets.

9. The magnetic energy converter as claimed in claim 1 comprises:
   a first circular profile;
   a set of first magnets;
   said at least one tier being multiple tiers;
   said set of first magnets being said first magnet from each of said multiple tiers;
   said first circular profile being perimetrically delineated by said first disk for each of said multiple tiers; and
   said set of first magnets being radially distributed about said first circular profile.

10. The magnetic energy converter as claimed in claim 1 comprises:
    a second circular profile;
    a set of second magnets;
    said at least one tier being multiple tiers;
    said set of second magnets being said second magnet from each of said multiple tiers;
    said second circular profile being perimetrically delineated by said second disk for each of said at least one tiers; and
    said set of second magnets being radially distributed about said second circular profile.

11. The magnetic energy converter as claimed in claim 1 comprises:
    said at least one tier being multiple tiers;
    said first axis and said second axis being a specified length; and
    said multiple tiers being distributed along said specified length.

12. The magnetic energy converter as claimed in claim 1, wherein said first axis and said second axis are hollow rigid tubes.

* * * * *